(12) United States Patent
Sai

(10) Patent No.: US 8,319,680 B2
(45) Date of Patent: Nov. 27, 2012

(54) RADAR LIQUID LEVEL DETECTION USING STEPPED FREQUENCY PULSES

(75) Inventor: Bin Sai, Den Haag (NL)

(73) Assignee: Enraf B.V., Delft (NL)

( * ) Notice: Subject to any disclaimer, the term of this patent is extended or adjusted under 35 U.S.C. 154(b) by 652 days.

(21) Appl. No.: 12/279,976

(22) PCT Filed: Feb. 19, 2007

(86) PCT No.: PCT/NL2007/000048
§ 371 (c)(1),
(2), (4) Date: Aug. 19, 2008

(87) PCT Pub. No.: WO2007/111498
PCT Pub. Date: Oct. 4, 2007

(65) Prior Publication Data
US 2011/0163910 A1    Jul. 7, 2011

(30) Foreign Application Priority Data
Feb. 22, 2006    (NL) ...................................... 1031209

(51) Int. Cl.
*G01S 13/08*    (2006.01)
(52) U.S. Cl. .................... 342/124; 73/290 R; 73/291
(58) Field of Classification Search ................ 342/124
See application file for complete search history.

(56) References Cited

U.S. PATENT DOCUMENTS

| | | |
|---|---|---|
| 3,217,267 A | 11/1965 | Loposer |
| 3,337,814 A | 8/1967 | Brase et al. |
| 3,353,104 A | 11/1967 | Loposer |
| 3,579,281 A | 5/1971 | Kam et al. |
| 3,789,302 A | 1/1974 | Rearwin et al. |
| 3,903,482 A | 9/1975 | Pausini et al. |
| 4,000,476 A | 12/1976 | Walker et al. |
| 4,024,464 A | 5/1977 | Underhill et al. |
| 4,027,274 A | 5/1977 | Fukui et al. |
| 4,068,199 A | 1/1978 | Madoff |
| 4,072,947 A | 2/1978 | Johnson |
| 4,114,110 A | 9/1978 | Nossen |
| 4,361,801 A | 11/1982 | Meyer et al. |
| 4,451,930 A | 5/1984 | Chapman et al. |
| 4,510,461 A | 4/1985 | Dickes et al. |
| 4,516,084 A | 5/1985 | Crowley |
| 4,567,448 A | 1/1986 | Ikeda |

(Continued)

FOREIGN PATENT DOCUMENTS

DE    296 08 551 U1    7/1996
(Continued)

OTHER PUBLICATIONS

"HERMetic Sensor", Honeywell Enraf, (no month) 207, 5 pages.
(Continued)

*Primary Examiner* — Timothy A Brainard

(57) ABSTRACT

The invention relates to a method for accurately determining the level L of a liquid by means of radar signals emitted to the liquid surface and radar signals reflected from the liquid surface. The invention further relates to a device for accurately determining the level of a liquid by means of the method according to the invention, which device comprises at least a radar antenna disposed above the liquid for emitting radar signals to the liquid and receiving radar signals reflected from the liquid surface, as well as means for determining the liquid level on the basis of the emitted radar signals and the reflected radar signals.

21 Claims, 10 Drawing Sheets

U.S. PATENT DOCUMENTS

| | | | |
|---|---|---|---|
| 4,675,617 A | 6/1987 | Martin | |
| 4,691,176 A | 9/1987 | Hsiung et al. | |
| 4,800,341 A | 1/1989 | Johnson | |
| 4,823,399 A | 4/1989 | George | |
| 4,868,494 A | 9/1989 | Ryder et al. | |
| 4,928,525 A | 5/1990 | Aderholt et al. | |
| 4,958,228 A | 9/1990 | Kutsuki | |
| 4,972,160 A | 11/1990 | Sylvain | |
| 5,027,526 A | 7/1991 | Crane | |
| 5,034,703 A | 7/1991 | Schumacher | |
| 5,036,291 A | 7/1991 | Marz | |
| 5,052,028 A | 9/1991 | Zwack | |
| 5,210,539 A | 5/1993 | Voyce | |
| 5,270,669 A | 12/1993 | Jokura | |
| 5,400,253 A | 3/1995 | O'Connor | |
| 5,406,842 A * | 4/1995 | Locke | 73/290 R |
| 5,428,361 A | 6/1995 | Hightower et al. | |
| 5,442,359 A | 8/1995 | Rubin | |
| 5,446,416 A | 8/1995 | Lin et al. | |
| 5,572,167 A | 11/1996 | Alder et al. | |
| 5,708,424 A | 1/1998 | Orlando et al. | |
| 5,734,302 A | 3/1998 | Teng et al. | |
| 5,773,913 A | 6/1998 | Casselden | |
| 5,774,089 A | 6/1998 | Bamler et al. | |
| 5,923,284 A * | 7/1999 | Artis et al. | 342/129 |
| 5,994,905 A | 11/1999 | Franchville | |
| 6,107,957 A | 8/2000 | Cramer et al. | |
| 6,114,987 A | 9/2000 | Bjornholt | |
| 6,374,187 B1 | 4/2002 | Knight et al. | |
| 6,404,288 B1 | 6/2002 | Bletz et al. | |
| 6,621,449 B1 | 9/2003 | Kunert | |
| 6,629,458 B1 | 10/2003 | Westerling et al. | |
| 6,636,575 B1 | 10/2003 | Ott | |
| 6,662,649 B1 | 12/2003 | Knight et al. | |
| 6,671,500 B2 | 12/2003 | Damgaard et al. | |
| 6,762,634 B1 | 7/2004 | Hattori | |
| 6,774,732 B1 | 8/2004 | Harnishfeger et al. | |
| 6,876,621 B2 | 4/2005 | Ohuchida et al. | |
| 7,135,870 B2 | 11/2006 | Mohajer et al. | |
| 7,891,229 B2 | 2/2011 | Sai | |
| 2002/0101373 A1 | 8/2002 | Arndt et al. | |
| 2002/0183030 A1 | 12/2002 | Damgaard et al. | |
| 2003/0167839 A1 | 9/2003 | Burger et al. | |
| 2004/0196177 A1 | 10/2004 | Billington et al. | |
| 2004/0207477 A1 | 10/2004 | Gumm | |
| 2005/0052314 A1 | 3/2005 | Spanke et al. | |
| 2005/0190098 A1 | 9/2005 | Bridgelall et al. | |
| 2005/0206555 A1* | 9/2005 | Bridgelall et al. | 342/127 |
| 2006/0044145 A1 | 3/2006 | Akerstrom et al. | |
| 2006/0044147 A1* | 3/2006 | Knox et al. | 340/686.1 |
| 2006/0143000 A1* | 6/2006 | Setoguchi | 704/205 |
| 2007/0046528 A1 | 3/2007 | Larsson et al. | |
| 2007/0109177 A1* | 5/2007 | Baath et al. | 342/124 |
| 2010/0002912 A1* | 1/2010 | Solinsky | 382/117 |
| 2010/0037673 A1 | 2/2010 | Wicht et al. | |
| 2010/0066589 A1 | 3/2010 | Sai et al. | |
| 2010/0070207 A1 | 3/2010 | Sai | |
| 2010/0070208 A1 | 3/2010 | Sai | |
| 2010/0070209 A1 | 3/2010 | Sai | |
| 2010/0175470 A1 | 7/2010 | Schrier et al. | |
| 2010/0241369 A1 | 9/2010 | Wicht et al. | |

FOREIGN PATENT DOCUMENTS

| | | |
|---|---|---|
| DE | 100 40 180 A1 | 4/2002 |
| DE | 10 2004 06144 | 6/2006 |
| DE | 10 2005 019 0 | 10/2006 |
| EP | 0 573 034 A | 12/1993 |
| EP | 0 887 658 A | 12/1998 |
| GB | 2 064 188 A | 6/1981 |
| GB | 2 342 995 A | 4/2000 |
| NL | 1032192 | 7/2006 |
| WO | WO 98/12514 A1 | 3/1998 |
| WO | WO 2004/018978 A1 | 3/2004 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/104967 A2 | 9/2008 |
| WO | WO 2010/019427 A2 | 2/2010 |

OTHER PUBLICATIONS

"Servo Gauge 854ATG" Product Sheet, Enraf B.V., May 2008, 4 pages.
"Starrett Digitape 25", 1999 and possibly earlier, 4 pages.
European Search Report dated Aug. 17, 2010 in connection with European Patent Application No. EP 10 15 5559.
International Standard, Petroleum and liquid petroleum products—Measurement of level and temperature in storage tanks by automatic methods, Part 3: Measurement of level in pressurized storage tanks (non-refrigerated), 1st Edition, Nov. 15, 2002, 21 pages.
"Level sensor", wikipedia.org, Aug. 2, 2008, 8 pages.
Communication pursuant to Article 94(3) EPC dated Jan. 11, 2010 in Communication with European Patent Application No. EP 09169534.
European Search Report dated Dec. 14, 2009 in connection with European Patent Application No. EP 09169534.
Notification of Transmittal of the International Search Report and the Written Opinion of the International Searching Authority, or the Declaration dated Oct. 28, 2008 in connection with PCT Patent Application No. PCT/NL2008/000196.
Bai Sin, et al., "Advanced High Precision Radar Gauge for Industrial Applications", Proceedings of the 2006 CIE International Conference on Radar, vol. 1, Oct. 16, 2006, pp. 463-466.

* cited by examiner

RADAR LIQUID LEVEL DETECTION USING STEPPED FREQUENCY PULSES

CROSS-REFERENCE TO RELATED APPLICATION(S)

The present application is related to Netherlands Patent Application No. 1031209 filed Feb. 22, 2006, entitled "METHOD AND DEVICE FOR ACCURATELY DETERMINING THE LEVEL L OF A LIQUID BY MEANS OF RADAR SIGNALS EMITTED TO THE LIQUID SURFACE AND RADAR SIGNALS REFLECTED FROM THE LIQUID SURFACE." Netherlands Patent Application No. 1031209 is hereby incorporated by reference into the present disclosure as if fully set forth herein. The present application hereby claims priority under 35 U.S.C. §119(a) to Netherlands Patent Application No. 1031209.

The invention relates to a phase-based method for accurately determining the level L of a liquid by means of radar signals emitted to the liquid surface and radar signals reflected from the liquid surface.

The invention further relates to a device for accurately determining the level of a liquid by means of the method according to the invention, which device comprises at least a radar antenna disposed above the liquid for emitting radar signals to the liquid and receiving radar signals reflected from the liquid surface, as well as means for determining the liquid level on the basis of the emitted radar signals and the reflected radar signals.

Radar (Radio Detection And Ranging) is widely used for contactless distance measurement. A very well-known principle is the time difference method. According to this method, a radar antenna emits a radar signal which strikes an object, for example a liquid surface. The object reflects part of the emitted radar signal/wave back in the direction of the radar antenna, which receives the reflected radar signal/wave.

Although it is possible to use separate radar antennas for the emitted radar signal and for the reflected radar signal, it is common practice to use the same radar antenna for emitting as well as for receiving. The radar system measures the time difference $\Delta t$ between the emitted radar signal and the received radar signal. If the velocity of the emitted radar signal is known, the distance to the surface of the liquid can be determined in a simple manner, using suitable measuring means.

A device as described in the introduction which employs the above measuring principle is frequently used for accurately determining the level of a liquid, for example water or oil, in a storage tank in the process industry or in an oil refinery by means of radar signals. The radar signals that are used are generally pulsed radar signals.

The methods that are currently known are in particular based on the phase difference between the emitted radar signal and the reflected radar signal. Unfortunately, the actual phase difference cannot be measured directly by the radar receivers that are currently used. Due to the unreliability and uncertainty as regards the measured phase difference, it is not possible to determine an unequivocal and reliable value of the actual level of the liquid.

The object of the method according to the invention is to obviate the above drawback and to introduce a more accurate measuring principle, in which the aforesaid inaccuracies in the measuring methods that are currently used are taken into account. In order to achieve that object, the method according to the invention comprises the steps of i) emitting radar signals having frequencies $f_1, f_2, \ldots$ and phases $\phi_{1i}, \phi_{2i}, \ldots$ in time sequence to the liquid surface;

ii) receiving the radar signals having frequencies $f_1, f_2, \ldots$ and phases $\phi_{1i}, \phi_{2i}, \ldots$ being reflected from the liquid surface in time sequence;

iii) determining the phase difference $\Delta\phi_1, \Delta\phi_2, \ldots$ between the emitted radar signals and the reflected radar signals;

iv) deriving the level L partially on the basis of the phase difference as determined.

More specifically, the method according to the invention is characterised in that step iv) comprises the steps of v) determining the frequency difference $\Delta f_{1-2}, \ldots$ between the successive emitted radar signals having frequencies $f_1, f_2, \ldots$;

vi) determining phase shift $\Delta\psi_{1-2}, \ldots$ between the successively determined phase differences $\Delta\phi_1, \Delta\phi_2, \ldots$.

According to the invention, a less accurate level value L' is then derived in step vii on the basis of the frequency difference $\Delta f_{1-2}$ and the phase shift $\Delta\psi_{1-2}$ as determined in steps v and vi.

Subsequently the actual phase difference can be determined by deriving the number k between the emitted radar signals and the reflected radar signals in step viii according to the invention on the basis of the less accurate level value L' as determined in step vii, on the basis of which actual phase difference the level L of the liquid is determined with a high degree of accuracy on the basis of the number k as determined in step viii and the phase difference as determined in step iii.

This provides a more accurate picture of the actual liquid level than is possible with the usual measuring methods. The phase-based signal processing method makes it possible to realise a level measurement with a margin of error of less than 1 mm. The invention makes use of the phase differences in radar signals at different frequencies.

In accordance with the measuring method according to the invention, the level L is determined by:

$$L = \Delta\phi_{1t} v / (4\pi f_1), \text{ wherein}$$

v the velocity of the radar signal through the medium;
$f_1$ the frequency of the radar signal;
$\Delta\phi_{1t}$ the actual phase difference between the emitted radar signal and the reflected radar signal having frequency $f_1$.

According to the method, an inaccurate level measurement is first carried out, wherein the inaccurate level L' is determined by:

$$L' = \Delta\psi_{12} v / (4\pi \Delta f_{12}), \text{ wherein}$$

v the velocity of the radar signal through the medium;
$\Delta f_{12}$ the frequency difference between the radar signals $f_1$ and $f_2$;
$\Delta\psi_{12}$ the phase shift between the phase differences $\Delta\phi_1$ and $\Delta\phi_2$.

The actual phase difference between the emitted radar signal and the reflected radar signal having frequency $f_1$ is determined by:

$$\Delta\phi_{1t} = \Delta\phi_1 + 2k\pi, \text{ wherein}$$

$\Delta\phi_1$ the measured phase difference between the emitted radar signal and the reflected radar signal having frequency $f_1$;
k the number.

The number k may be determined by means of the measuring method according to the invention on the basis of $k=|2f_1 L'/v|$, after the determination of the number k the actual phase difference between the emitted radar signal and the reflected radar signal having frequency $f_1$ can be determined, on the basis of which the actual level measurement L can be realised.

The device according to the invention is characterised in that the radar antenna is arranged for emitting radar signals having frequencies $f_1, f_2, \ldots$ and phases $\phi_{1i}, \phi_{2i}, \ldots$ to the liquid surface in time sequence; as well as for receiving radar signals having frequencies $f_1$, $f_2$, ... and phases $\phi_{1j}$ being reflected from the liquid surface in time sequence; wherein said means are arranged for determining the phase difference $\Delta\phi_1$, $\Delta\phi_2$, ... between the emitted radar signal and the reflected radar signals and deriving the level L partially on the basis of the determined phase difference.

More specifically said means are arranged for determining the frequency difference $\Delta f_{1-2}$, ... between the successive emitted radar signals having frequencies $f_1$, $f_2$, ... and determining the phase shift $\Delta\psi_{1-2}$, ... between the successively determined phase differences $\Delta\phi_1$, $\Delta\phi_2$, ..., wherein said means are furthermore arranged for deriving a less accurate level value L' on the basis of the determined frequency difference $\Delta f_{1-2}$ and the phase shift $\Delta\psi_{1-2}$, and for furthermore deriving the number k between the emitted radar signals and the reflected radar signals on the basis of the less accurate level value L'.

Analogously to the above-described measuring method, said means are according to the invention arranged for determining the level L on the basis of the number k as determined and the phase difference as determined.

The method and invention according to the invention will now be explained in more detail with reference to drawings.

As already set forth above, the invention relates to a phase-based method for determining the level of a liquid in a reliable and very accurate manner. The method uses radar signals for determining the level of a product that is stored in, for example, a storage tank, wherein the presence of all kinds of obstacles or parts in the tank does not interfere with the measuring method.

BRIEF DESCRIPTION OF THE DRAWINGS

A well-known principle for level measurement is to use pulsed radar signals. FIG. 1 schematically shows a device for determining the level of the liquid in a tank in accordance with this known measuring principle. The device 10 is disposed in the upper part of a tank 1, which is built up of walls 1a, a roof 1b and a bottom 1c. The height of the tank 1 is indicated by the letter H.

Present in the tank 1 is an amount of liquid 2, and the height of the liquid level 3 is indicated by the letter L.

Figure 2:
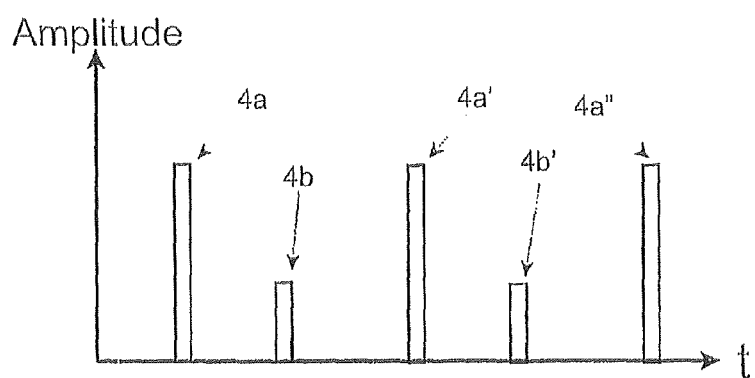
FIGS. 2 and 3 illustrate radar signals used to determine a level of a liquid in a tank.

The device 10 has at least one radar antenna 12, which is provided with an emitting surface 11 for emitting a radar signal 4a in the direction of the liquid surface 3. The radar signal 4a (shown in FIG. 2) is partially reflected from the liquid surface 3 and the reflected radar signal 4b (also shown in FIG. 2) is in turn intercepted by the radar antenna 12. It is also possible, of course, to use a separate antenna for emitting the radar signals to the liquid surface and a separate receiver for intercepting the reflected radar signals.

The device 10 according to the prior art is also provided with means for determining the liquid level 3 (L) on the basis of the emitted radar signal 4a and the reflected radar signal 4b, wherein the measuring system is based on the determination of the time difference $\Delta t$ between the emitted signal pulse and the received signal pulse. Since the velocity of the radar signal is known, the distance to the measuring object or, in this case to the liquid surface, can be determined by $$L = H - h = \tfrac{1}{2} \cdot v \cdot \Delta t \tag{1}$$

wherein
H=the height of the tank [m]
L=the distance between the radar antenna and the liquid surface [m]
h=the height of the liquid surface [m]
v=the propagation velocity of the radar waves through the medium [m/sec]
$\Delta t$=the time difference between the emitted radar signal and the reflected radar signal [sec]

A drawback of level measurement based on pulsed radar signals is that the time measurement between the emitted radar signal and the received radar signal must be very high. An inaccurate time measurement will inevitably result in an inaccurate level measurement. The measurement on the basis of pulsed radar signals depends inter alia on the pulse shape of the radar signal and possibly also on the pulse amplitude. In addition to that, reflections of the radar signal from objects other than the liquid surface interfere with this method.

Figure 3:
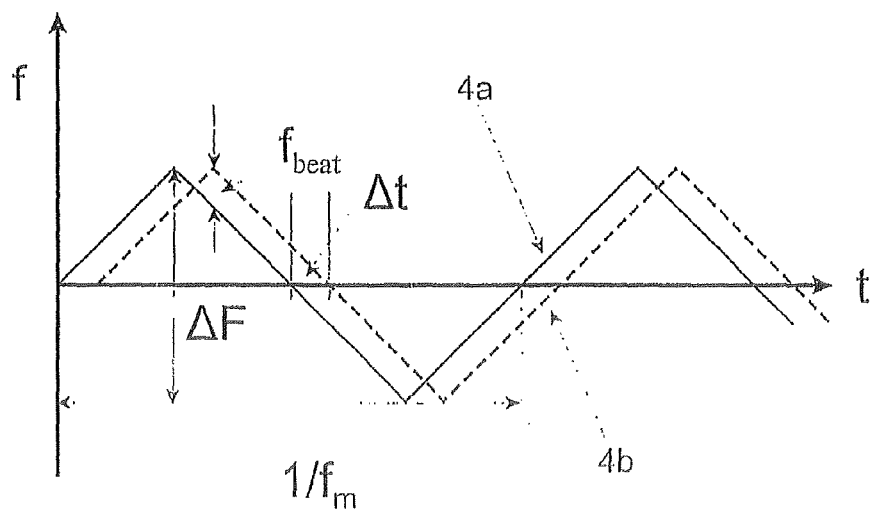

A more extensive method uses frequency modulation (Frequency Modulation Continuous-Wave radar), wherein the frequency of the radar signal changes over time. The signal may for example be triangular in shape, as shown in FIG. 3. As a result of the time delay caused by the distance to be covered between the antenna and the target surface, a frequency difference $f_{beat}$ exists between the emitted radar signal 4a and the reflected radar signal 4b. Said frequency $f_{beat}$ can be calculated by Fourier transformation (see FIG. 4). The distance L can thus be determined for the triangular signal:

$$L = \frac{f_{beat} v}{4 \Delta F f_m} \tag{2}$$

wherein
$f_m$=the modulation frequency [Hz]
$\Delta F$='sweep' frequency band [Hz]
$f_{beat}$=the 'beat' frequency between the emitted radar signal and the received radar signal [Hz]
v=the propagation velocity of the radar waves through the medium [m/sec]

Figure 4:
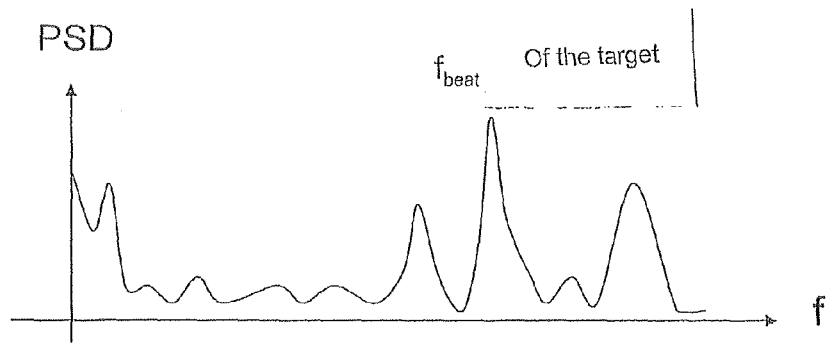
FIG. 4 illustrates a power spectral density (PSD) diagram of radar signals.

The FMCW technology does not have the drawbacks of the pulsed radar measurement. The time delay measurement has been substituted for a more accurate frequency count. It is possible to use a Fast Fourier Transformation (FFT) in the digital signal processing so as to obtain a power spectrum density (PSD) in which the power distribution, seen over the frequency band of the beat signal, is shown as a single peak. If reflections occur, as caused by the presence of objects (obstructions) in the path of the signals, the reflections will appear as multiple peaks in the PSD diagram, as also shown in FIG. 4. An ordinary software algorithm may be used for determining the medium frequence $f_{beat}$ of the correctly selected peak, which corresponds to the reflection from the liquid surface.

The above-described measuring method of the FMCW radar has a number of significant drawbacks, however. In the first place, heavy demands are made on the stability of the slope of the frequency "sweep", which must be constant to a high degree. In the second place it is difficult to maintain the high linearity of the "sweep" shape, and thus the medium frequency of the frequency band is indistinct. In the third-place, the calculation by means of Fourier Transformation of the exact centre of the beat frequency is very sensitive to interference by reflections (indicated at 4' in FIG. 1) caused by obstacles, such as tank mixers (indicated at the 5 in FIG. 1 and provided with stirring elements 5a), the tank bottom (1c), the tank wall (1a), ladders, heat exchangers, said drive, and this may therefore lead to errors in the range of a few millimeters.

Figure 5:
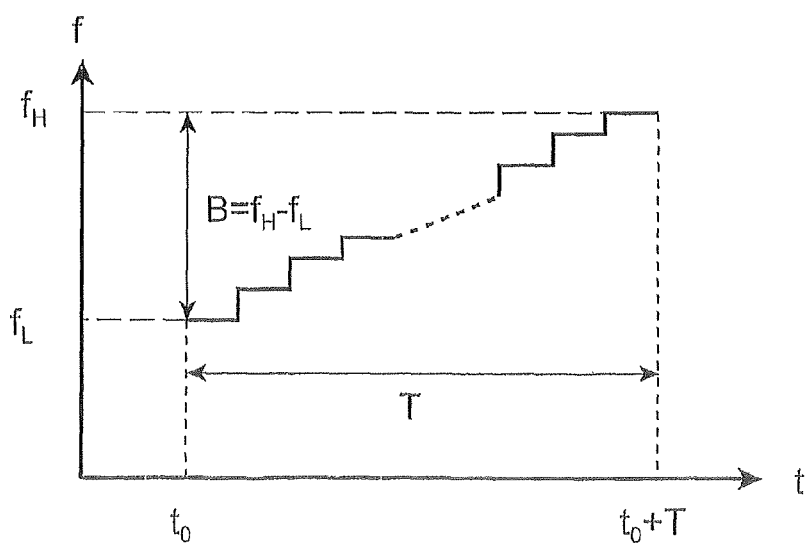
FIG. 5 illustrates operation of a Stepped Frequency-Continuous Wave (SF-CW) radar.

For this purpose a measuring technique referred to as Stepped Frequency-Continuous Wave (SF-CW) has been developed. The SF-CW radar method emits and receives a series of sinusoidal signals at discrete frequencies that fill the frequency band, which is required in the measurement and the control (FIG. 5). Using an SF-CW radar installation, the target distance can be established by determining the phase-distance relationship, or:

$$\Delta \varphi_t = \frac{4\pi L f}{v} \quad (3)$$

wherein
$\Delta \varphi_t$ = the phase difference between the reference signal and the reflected signal
L = the distance between the radar antenna and the object to be measured [m]
f = one of the 'discrete' frequencies [Hz]
v = the propagation velocity of the radar waves through the medium [m/sec]

Figure 6:
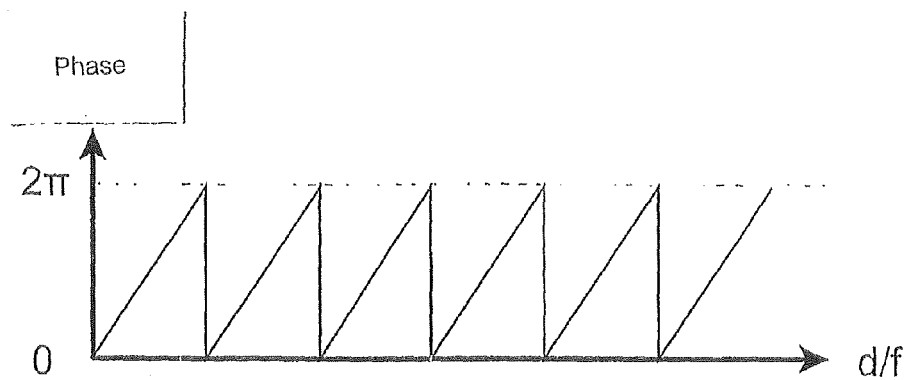
FIG. 6 illustrates phase indistinctness in radar signals.

This actual phase difference $\Delta \varphi_t$ cannot be measured directly by means of a radar instrument due to the phase indistinctness $2\pi$ and indistinct disturbances in the phase characteristic. The measured phase difference is represented as $\Delta \varphi_w$. Usually the phase signal is represented as a sinus signal, for example as $\cos(\Delta \varphi_w)$ or $\sin(\Delta \varphi_w)$. As $\sin(\Delta \varphi) = \sin(\Delta \varphi + 2k\pi)$, with k being an integer, accurate information is lost. Since the exact value k is not known, the measurement will be inaccurate as well. The factor k is the so-called 'wrapping' factor and results in a phase indistinctness 'wrapped phase' $\Delta \varphi_w$. See also FIG. 6. In the case of a discrete signal this phase is represented as:

$$\Delta \varphi_w = \Delta \varphi_t - 2k\pi \quad (4)$$

In (4) k is an integer, such that $0 \leq \Delta \varphi_w < 2\pi$. The inaccuracy caused by the value of the k-number is best illustrated by expressing the distance L as a function of the k-number:

$$L = \frac{v}{4\pi f}(\Delta \varphi_w + 2k\pi) \quad (5)$$

For example, RADAR-based level measurement devices operate predominantly in the frequency bandwidth of 8-12.5 Ghz (the X-band). A frequency of 10 GHz corresponds to a wavelength λ that equals 30 mm in vacuum. If the number k changes by 1, this corresponds to a distance change of 15 mm. Consequently, the number k is of major importance for an accurate measurement of the level distance L.

Figure 7:
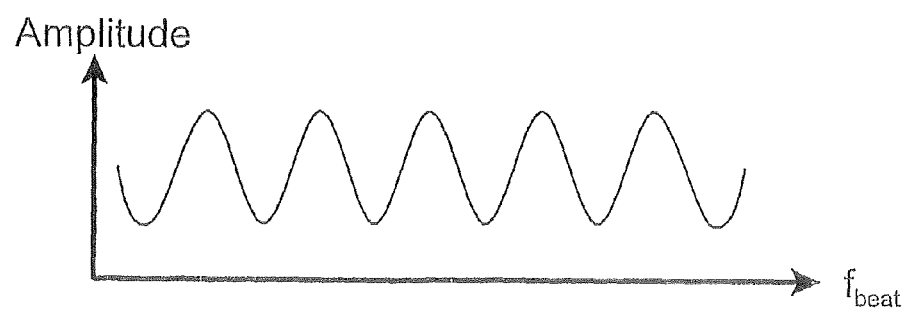
FIG. 7 illustrates a number of periods of a sinus waveform during a frequency measurement.

In digitised data the phase indistinctness can be calculated at the central frequency or medium frequency of the frequency bandwidth. A usual method (the so-called PSD method, as discussed above) for determining the distance L from a $\cos(\Delta \varphi_w)$ signal is to determine the number of periods of the sinus waveform during a frequency measurement as shown in FIG. 7. This is the same as the Fourier transformation in the PSD method. Thus it can be derived that the following applies with regard to the distance:

$$L_{PSD} = m \cdot \frac{v}{2(f_{max} - f_{min})} \quad (6)$$

wherein m is the number of periods of the signal. By using the amplitude-based (PSD) starting distance $L_{PSD}$, the indistinctness factor of the number k can be determined on the basis of:

$$k_{PSD} = \text{int}\left[\frac{2 f L_{PSD}}{v}\right] \quad (7)$$

The factor int[..] represents a rounding-off factor, which rounds off k to the nearest integer. By means of the indistinctness factor ('wrapping factor') k thus obtained, the normal phase based distance $L_{conv}$ can be obtained analogously to (5):

$$L_{CONV} = \frac{v}{4\pi f}(\Delta \varphi_w + 2k_{PSD}\pi) \quad (8)$$

However, if the error in the PSD-based distance $L_{PSD}$ is greater than a quarter of the wavelength, i.e. 7.5 mm at 10 GHz, this will lead to an incorrect indistinctness factor $k_{PSD}$ and accordingly also to an incorrect phase distance $L_{CONV}$ with an error of a magnitude several times that of a half wavelength. This means that the accuracy of the normal phase-based level depends strongly on the PSD-based level. It is generally known that the PSD-based method is sensitive to various interferences. If an interfering object is present in the path of the radar beam, an error of a magnitude of tenths of millimeters in the PSD-based level measurement is likely to occur. The interfering objects or obstacles may be the wall 1a, the bottom 1c etc of the storage vessel 1, for example, as well as mixers (5-5a), heat coils or ladders. See FIG. 1.

It has been found that an error of a few % near a peak in the PSD spectrum already suffices for generating an incorrect indistinctness factor $k_{PS}$. In addition to that the interference from the nearby antenna area may also lead to significant errors if the level of the medium in the storage tank rises to a height near the antenna. Generally the usual PSD method is very sensitive, and this leads to an unstable and inaccurate calculation method. As a result, the error comprises a "level leap" of half the wavelength in the normal "phase-based" method, which is 15 mm in the X-bandwidth. Such level leaps are highly undesirable in some applications.

Moreover, some known FMCW and/or SFCW phase-based measuring methods use the relative phase measurement for the purpose of correcting for the distance change between two successive measurements.

$$L_{CONV} = L_0 + \Delta L_1 + \Delta L_2 + \ldots + \Delta L_j \quad (9)$$

wherein
$L_0$=the starting distance [m]
$\Delta L_1$, $\Delta L_2$=the difference distances between two successive measurements [m]

It will be understood that accumulating errors may become very large errors, even if only the one-off incorrect indistinctness factor is represented by $L_{PSD}$. Thus the vulnerability of the normal phase-based distance calculation is affected by an incorrect PSD-based method, resulting in a poor accuracy performance.

The method according to the invention is aimed at neutralising this measuring error. From the above equation (3) it has already been determined that if the actual phase at one or more frequencies is known, the absolute distance to the target (L) can be determined on the basis of:

$$L = \frac{v}{4\pi f} \Delta \varphi_t \quad (10)$$

A known characteristic of the digitally controlled SF-CW radar technology is that every step frequency that is generated is known. According to the invention, the method uses the phase variations at different frequencies for solving the phase indistinctness of a half wavelength and thus accurately determining the absolute distance L. The method according to the invention relates to the use of the measured or formed phase at two different frequencies for determining the rough distance on the basis of:

$$L_{coarse} = \frac{v}{4\pi \Delta f} \Delta \psi_w \quad (11)$$

wherein $\Delta f = f_1 - f_2$ and $\Delta \psi_w = \Delta \phi_w(f_1) - \Delta \phi_w(f_2)$. The integer k can subsequently be determined by means of the rough level measurement $L_{coarse}$, in accordance with:

$$k_\psi = \text{int}\left[\frac{2 f L_{coarse}}{v}\right] \quad (12)$$

In this case, too, the factor int[..] indicates a rounding-off factor, which rounds off k to the nearest integer. Thus the phase and the number can be utilised for determining whether the absolute phase between the emitted radar signal and the reflected signal and consequently also for determining the absolute, very accurate level distance $L_{INV}$:

$$L_{INV} = \frac{v}{4\pi f}(\Delta \varphi_w + 2k_\psi \pi) \quad (13)$$

The measuring method according to the invention is characterised as an independent, phase-based signal processing method. Using the above-described method, very reliable and repeatable accuracies of ±1 mm or better can be realised, even in complex measuring conditions.

Consequently, the method according to the invention does not use the known, less accurate PSD as a reference for the phase indistinctness. In contrast to the known methods, the method according to the invention does not make use of the relative phase distance change with respect to the preceding measurement that influences the current distance. It calculates the absolute phase and distance with every measurement, which gives an absolute measure of the current target distance. Thus, the phase error accumulation from preceding measurements is entirely prevented by using this method.

Figure 1:
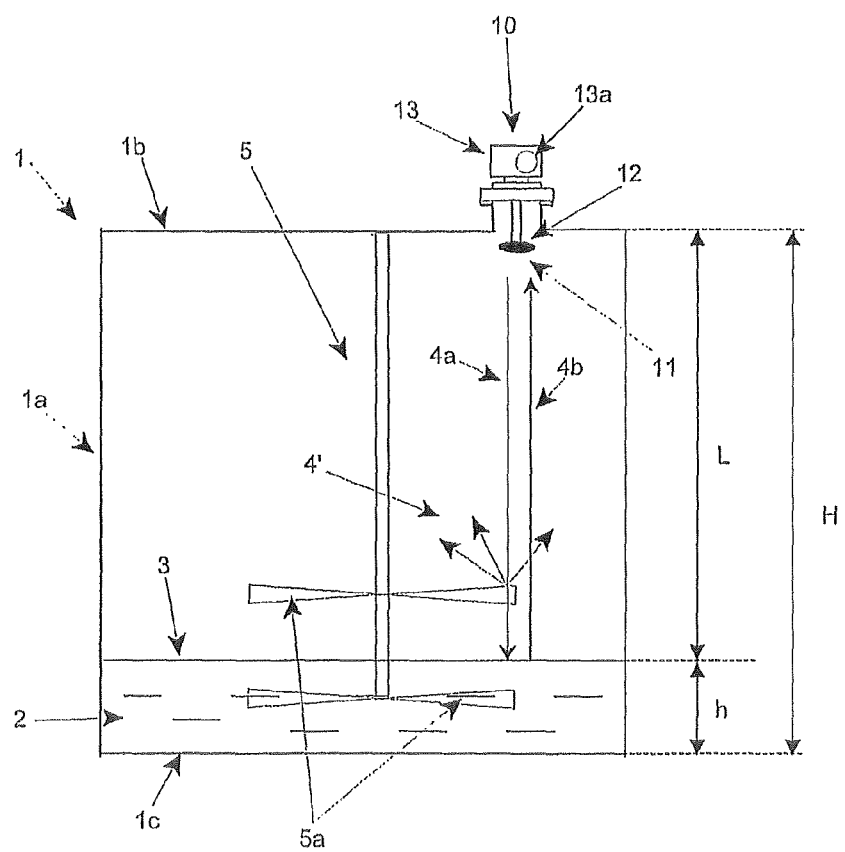
FIG. 1 schematically shows a device for determining a level of a liquid in a tank.

According to the invention the level determining means 13 of the device 10 shown in FIG. 1 further comprise an information processing unit 13a, which is arranged for determining whether the phase difference $\Delta \phi_1$, $\Delta \phi_2$, ... between the emitted signals 4a and the reflected radar signals 4b and deriving the level L, partially on the basis of the determined phase difference, in accordance with the steps of the method according to the invention.

Figure 8A:
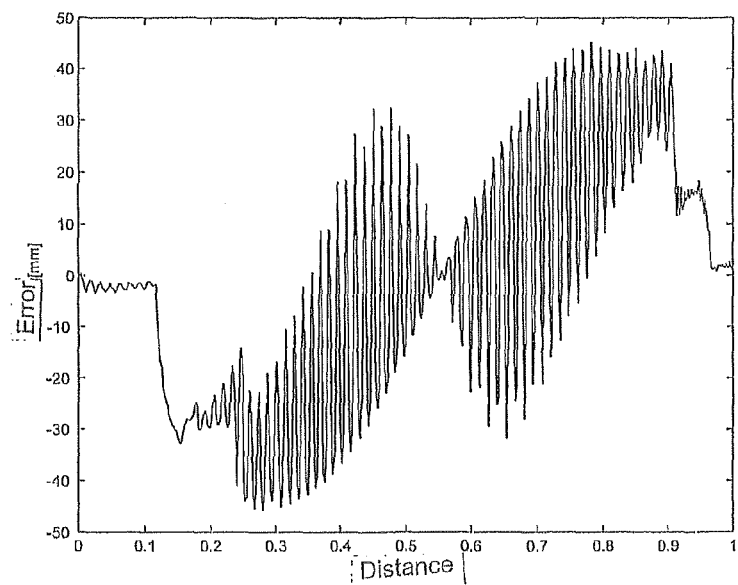
FIGS. 8a-8b-8c illustrate obstacle test results obtained with different measuring methods.
Figure 8B:
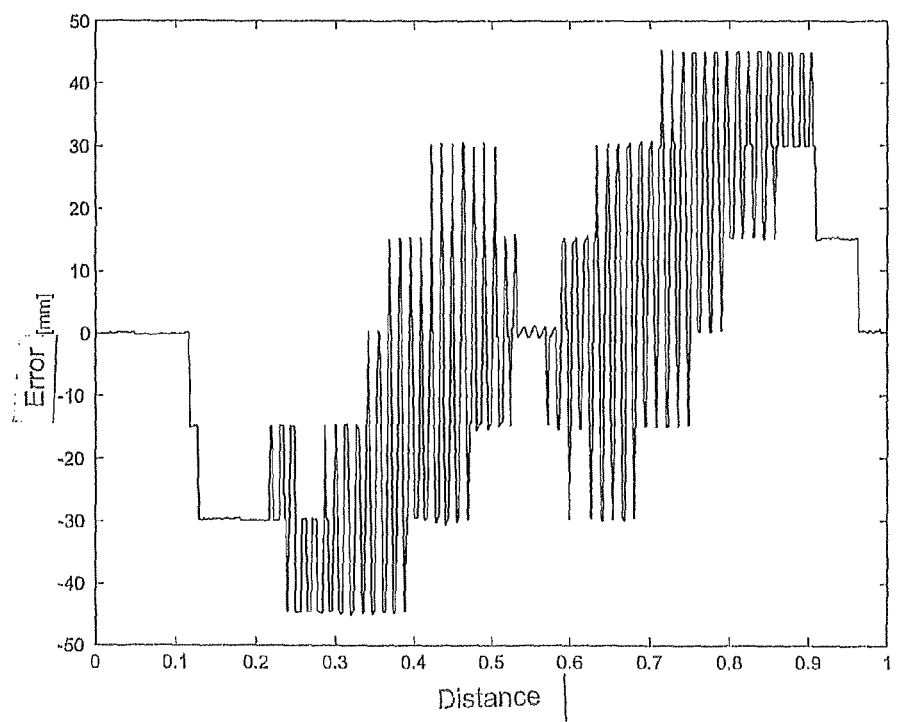
Figure 8C:
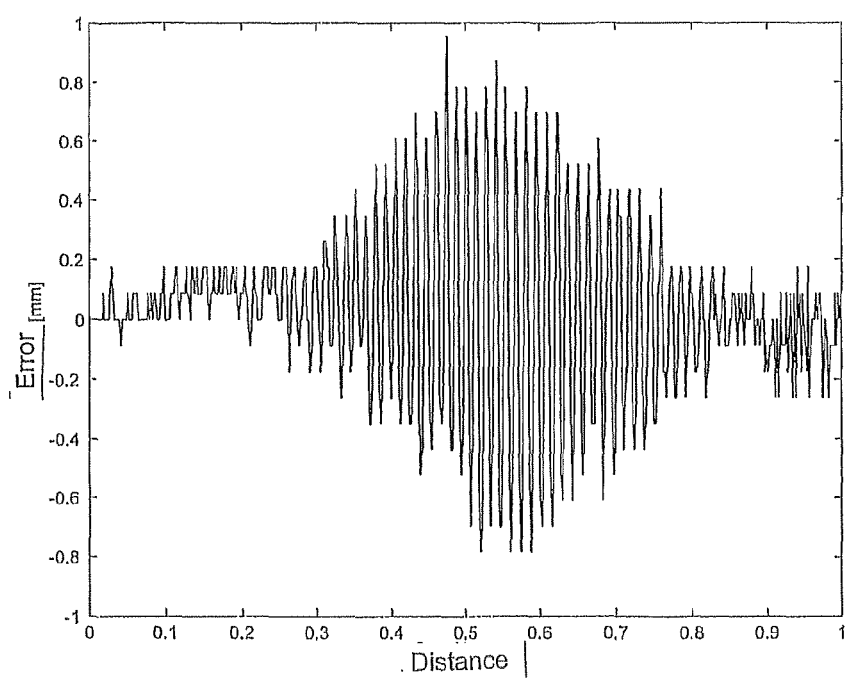
Figure 9A:
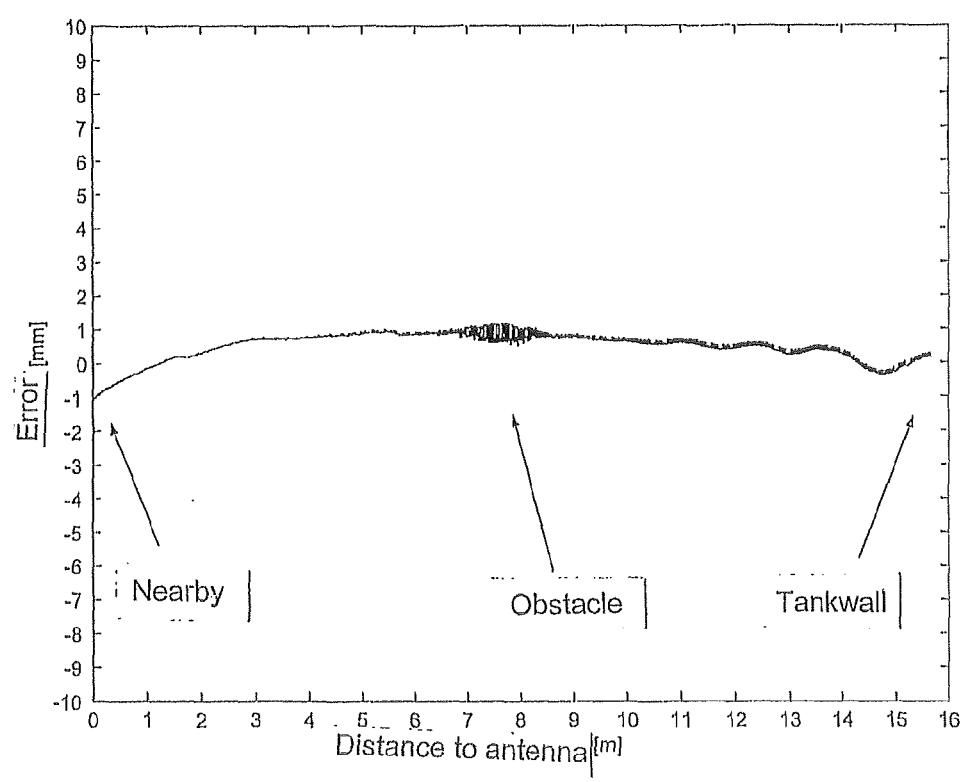
FIGS. 9a-9b illustrate test results involving tank wall effects, obstacles and near effects obtained with different measuring methods.
Figure 9B:
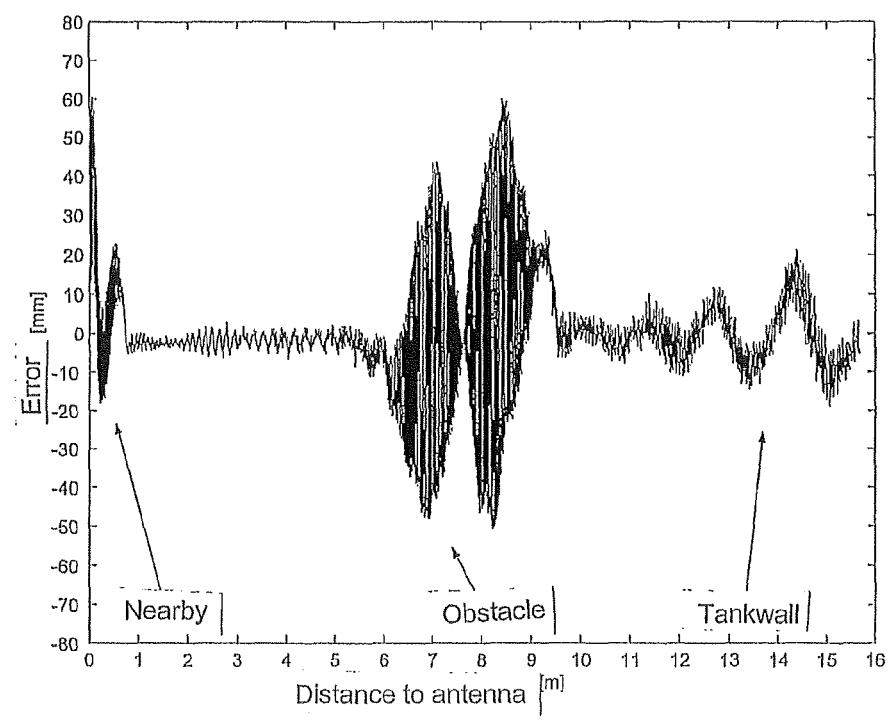
Figure 10:
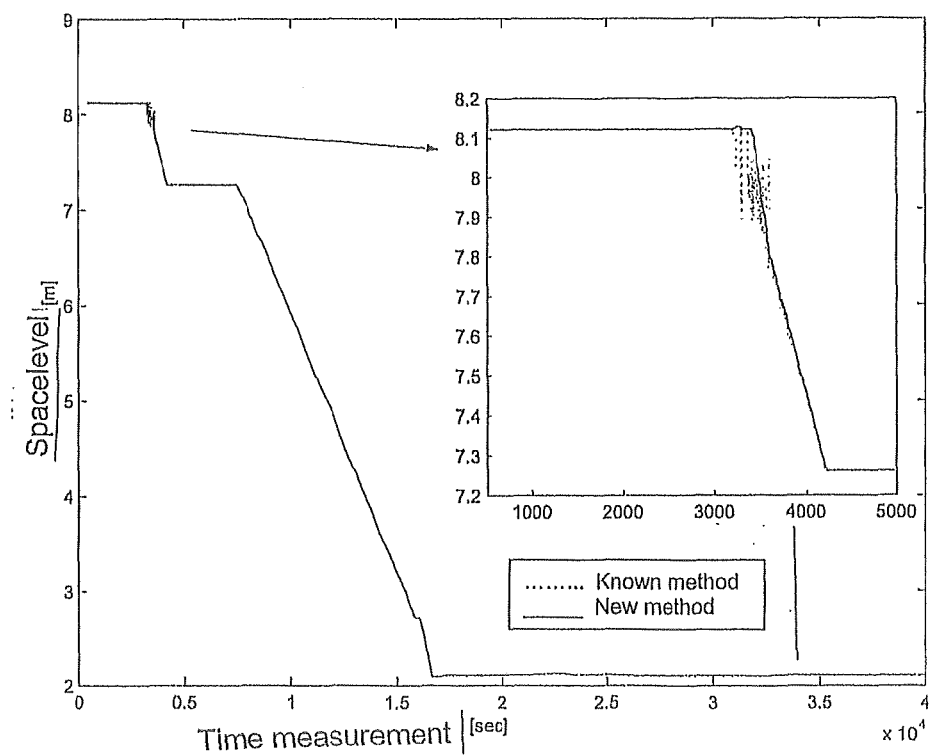
FIG. 10 illustrates test results involving tank bottom effects.

A few test results or measurement data are shown in FIGS. 8, 9 and 10. The obstacle test is shown in FIGS. 8a-8b-8c.

This so-called obstacle test is carried out in the level measurement to determine the existence of undesirable objects that will appear in the radar beam during the target measurement. Said undesirable objects may be so-called tank mixers 5-5a, ladders, heat coils, the tank bottom 1c, the tank wall 1a, etcetera (see FIG. 1). These undesirable objects or obstacles may interfere electromagnetically with the normal target detection and target measurements.

To illustrate this, FIGS. 8a-8c show test results obtained with different measuring methods for determining the level in a storage tank: the known, amplitude-based method (FIG. 8a entitled "Level error when using the PSD-amplitude method $L_{PSD}$"), the phase-based method (FIG. 8b entitled "Level error when using the normal phase method $L_{CONV}$") and the method according to the invention (FIG. 8c entitled "Level error when using the method according to the invention $L_{INV}$"). It is apparent that the accuracy and the repeatability the new phase-independent method as described in the present patent application are much higher than those obtained with the known phase-based and/or PSD-based methods. Its accuracy is about 50 times better than that achieved with the known method. The tests aimed at the tank wall effects, obstacles and near effects are shown in FIG. 9a L "INV—new method", in which the accuracy of the method according to the invention is compared with that of normal PSD-based methods (FIG. 9b entitled "$L_{PSD}$—known Fourier FMCW method"). Its accuracy is about 55 times better than that achieved with the usual method.

The results of the test carried out to determine the effect of the bottom on the measurement are shown in FIG. 10 (entitled "Obstacle (heating element) near the bottom"). The empty tank is filled with a chemical liquid. The bottom reflection has a major effect on the liquid level measurement as carried out by means of the known method, whereas the effect on the level measurement as carried out by means of the method according to the invention is only minor.

The invention claimed is:

1. A method for accurately determining a level of a liquid, the method comprising:
   emitting radar signals towards the liquid, the emitted radar signals having multiple frequencies and multiple first phases;
   receiving radar signals reflected from the liquid, the reflected radar signals having the multiple frequencies and multiple second phases;
   determining multiple phase differences between the emitted radar signals and the reflected radar signals; and
   deriving the level of the liquid based on an actual phase difference between the emitted radar signal having a first frequency and the reflected radar signal having the first frequency;
   wherein the actual phase difference is determined based on a measured phase difference between the emitted radar signal having the first frequency and the reflected radar signal having the first frequency; and wherein the measured phase difference is adjusted using a wrapping factor determined by:
deriving a second level value based on a phase shift between phase differences associated with successively emitted and received radar signals having different frequencies; and
deriving a value of the wrapping factor based on the second level value.

2. The method according to claim 1, wherein deriving the second level value comprises:
determining a frequency difference between the successively emitted and received radar signals having the different frequencies; and
using the phase shift and the frequency difference to determine the second level value.

3. The method according to claim 2, wherein the second level value is determined using a formula of:

$$L' = \Delta\psi_{1\text{-}2} v/(4\pi\Delta f_{12})$$

wherein L' represents the second level value;
wherein v represents a velocity of the radar signals through a medium,
wherein $\Delta f_{12}$ represents the frequency difference between the first frequency of the radar signals and a second frequency of the radar signals; and
wherein $\Delta\psi_{1\text{-}2}$ represents the phase shift between the phase difference associated with the first frequency of the radar signals and the phase difference associated with the second frequency of the radar signals.

4. The method according to claim 1, wherein the value of the wrapping factor is rounded to a nearest integer.

5. The method according to claim 1, wherein the level of the liquid is determined using a formula of:

$$L = v(\Delta\phi_w + 2k\pi)/(4\pi f)$$

wherein L represents the level of the liquid;
wherein v represents a velocity of the radar signals through a medium;
wherein $\Delta\phi_w$ represents the measured phase difference;
wherein k represents the value of the wrapping factor; and
wherein f represents the first frequency.

6. The method according to claim 1, wherein the level of the liquid is determined using a formula of:

$$L = \Delta\phi_{1t} v/(4\pi f_1)$$

wherein L represents the level of the liquid;
wherein v represents a velocity of the radar signals through a medium;
wherein $f_1$ represents the first frequency; and
wherein $\Delta\phi_{1t}$ represents the actual phase difference.

7. The method according to claim 6, wherein the actual phase difference is determined using a formula of:

$$\Delta\phi_{1t} = \Delta\phi_1 + 2k\pi$$

wherein $\Delta\phi_1$ represents the measured phase difference between the emitted radar signal having the first frequency and the reflected radar signal having the first frequency; and
wherein k represents the value of the wrapping factor.

8. The method according to claim 1, wherein the value of the wrapping factor is determined using a formula of:

$$k = |2fL'/v|$$

wherein k represents the value of the wrapping factor;
wherein f represents one of the frequencies of the radar signals;
wherein L' represents the second level value; and
wherein v represents a velocity of the radar signals through a medium.

9. A system for accurately determining a level of a liquid, the system comprising:
a radar antenna configured to emit radar signals to the liquid and to receive radar signals reflected from the liquid, the emitted radar signals having multiple frequencies and multiple first phases, the reflected radar signals having the multiple frequencies and multiple second phases; and
a processing unit configured to determine the level of the liquid based on the emitted radar signals and the reflected radar signals, wherein the processing unit is configured to determine the level of the liquid by:
determining multiple phase differences between the emitted radar signals and the reflected radar signals; and
deriving the level of the liquid based on an actual phase difference between the emitted radar signal having a first frequency and the reflected radar signal having the first frequency;
wherein the processing unit is configured to determine the actual phase difference based on a measured phase difference between the emitted radar signal having the first frequency and the reflected radar signal having the first frequency;
wherein the processing unit is configured to adjust the measured phase difference using a wrapping factor to generate the actual phase difference; and
wherein the processing unit is configured to determine the wrapping factor by:
deriving a second level value based on a phase shift between phase differences associated with successively emitted and received radar signals having different frequencies; and
deriving a value of the wrapping factor based on the second level value.

10. The system according to claim 9, wherein the processing unit is configured to derive the second level value by:
determining a frequency difference between the successively emitted and received radar signals having the different frequencies; and
using the phase shift and the frequency difference to determine the second level value.

11. The system according to claim 9, wherein the processing unit is configured to determine the level of the liquid using an equation:

$$L = v(\Delta\phi_w + 2k\pi)/(4\pi f)$$

wherein L represents the level of the liquid;
wherein v represents a velocity of the radar signals through a medium;
wherein $\Delta\phi_w$ represents the measured phase difference;
wherein k represents the value of the wrapping factor; and
wherein f represents the first frequency.

12. The system according to claim 9, wherein the processing unit is configured to determine the level of the liquid using an equation:

$$L = \Delta\phi_{1t} v/(4\pi f_1)$$

wherein L represents the level of the liquid;
wherein v represents a velocity of the radar signals through a medium;
wherein $f_1$ represents the first frequency; and
wherein $\Delta\phi_{1t}$ represents the actual phase difference.

13. The system according to claim 12, wherein the processing unit is configured to determine the actual phase difference using an equation:

$$\Delta\phi_{1r} = \Delta\phi_1 + 2k\pi$$

wherein $\Delta\phi_1$ represents the measured phase difference between the emitted radar signal having the first frequency and the reflected radar signal having the first frequency; and wherein k represents the value of the wrapping factor.

14. The system according to claim 9, wherein the processing unit is configured to determine the second level value using an equation:

$$L' = \Delta\psi_{1-2} v / (4\pi \Delta f_{12})$$

wherein L' represents the second level value;
wherein v represents a velocity of the radar signals through a medium;
wherein $\Delta f_{12}$ represents the frequency difference between the first frequency of the radar signals and a second frequency of the radar signals; and
wherein $\Delta\psi_{1-2}$ represents the phase shift between the phase difference associated with the first frequency of the radar signals and the phase difference associated with the second frequency of the radar signals.

15. The system according to claim 9, wherein the processing unit is configured to determine the value of the wrapping factor using an equation:

$$k = |2fL'/v|$$

wherein k represents the value of the wrapping factor;
wherein f represents one of the frequencies of the radar signals;
wherein L' represents the second level value; and
wherein v represents a velocity of the radar signals through a medium.

16. A device comprising:
a processing unit configured to determine a level of a liquid based on emitted radar signals and reflected radar signals, the emitted radar signals having multiple frequencies and multiple first phases, the received radar signals having the multiple frequencies and multiple second phases;
wherein the processing unit is configured to determine the level of the liquid by:
determining multiple phase differences between the emitted radar signals and the reflected radar signals; and
deriving the level of the liquid based on an actual phase difference between the emitted radar signal having a first frequency and the reflected radar signal having the first frequency;
wherein the processing unit is configured to determine the actual phase difference based on a measured phase difference between the emitted radar signal having the first frequency and the reflected radar signal having the first frequency;
wherein the processing unit is configured to adjust the measured phase difference using a wrapping factor to generate the actual phase difference; and
wherein the processing unit is configured to determine the wrapping factor by:
deriving a second level value based on a phase shift between phase differences associated with successively emitted and received radar signals having different frequencies; and
deriving a value of the wrapping factor based on the second level value.

17. The device of claim 16, wherein the processing unit is configured to derive the second level value by:
determining a frequency difference between the successively emitted and received radar signals having the different frequencies; and
deriving the second level value based on the frequency difference and the phase shift.

18. The device of claim 16, wherein the processing unit is configured to determine the value of the wrapping factor using a formula of:

$$k = |2fL'/v|$$

wherein k represents the value of the wrapping factor;
wherein f represents one of the frequencies of the radar signals;
wherein L' represents the second level value; and
wherein v represents a velocity of the radar signals through a medium.

19. A non-transitory machine readable medium containing instructions that when executed cause a processing unit to:
determine multiple phase differences between emitted radar signals emitted towards a liquid and reflected radar signals reflected from the liquid, the emitted radar signals having multiple frequencies and multiple first phases, the reflected radar signals having the multiple frequencies and multiple second phases; and
derive a level of the liquid based on an actual phase difference between the emitted radar signal having a first frequency and the reflected radar signal having the first frequency, the actual phase difference based on a measured phase difference between the emitted radar signal having the first frequency and the reflected radar signal having the first frequency;
wherein the instructions that when executed cause the processing unit to derive the liquid level comprise instructions that when executed cause the processing unit to adjust the measured phase difference using a wrapping factor; and
wherein instructions that when executed cause the processing unit to determine the wrapping factor comprise instructions that when executed cause the processing unit to:
derive a second level value based on a phase shift between phase differences associated with successively emitted and received radar signals having different frequencies; and
derive a value of the wrapping factor based on the second level value.

20. The machine readable medium of claim 19, wherein the instructions that when executed cause the processing unit to derive the value of the wrapping factor comprise instructions that when executed cause the processing unit to derive the value of the wrapping factor using a formula of:

$$k = |2fL'/v|$$

wherein k represents the value of the wrapping factor;
wherein f represents one of the frequencies of the radar signals;
wherein L' represents the second level value; and
wherein v represents a velocity of the radar signals through a medium.

21. The machine readable medium of claim 19, wherein the instructions that when executed cause the processing unit to derive the second level value comprise instructions that when executed cause the processing unit to:
determine a frequency difference between the successively emitted and received radar signals having the different frequencies; and
use the phase shift and the frequency difference to determine the second level value.

* * * * *